J. F. WEBENDORFER.
LATHE.
APPLICATION FILED MAR. 19, 1906.

1,000,764.

Patented Aug. 15, 1911.

4 SHEETS—SHEET 3.

WITNESSES:

INVENTOR
J. F. Webendorfer
BY
Warfield & Duell
ATTORNEYS.

J. F. WEBENDORFER.
LATHE.
APPLICATION FILED MAR. 19, 1906.
1,000,764.
Patented Aug. 15, 1911.
4 SHEETS—SHEET 4.
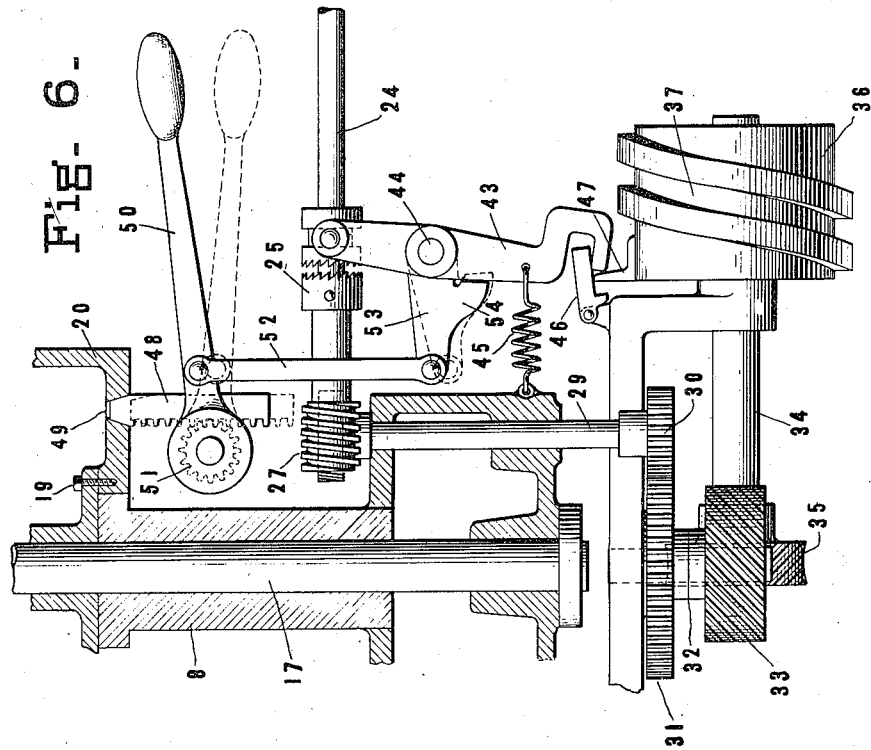
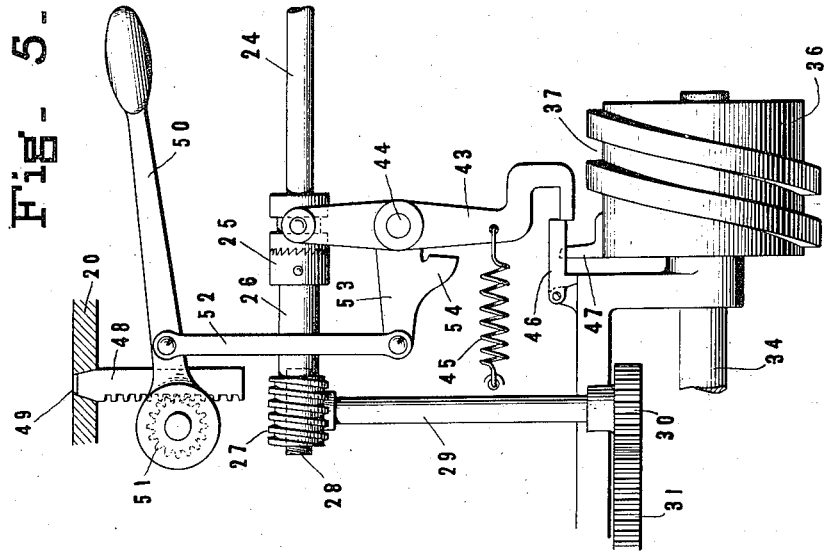
WITNESSES:
INVENTOR
J. F. Webendorfer
BY
Warfield & Duell
ATTORNEYS.

UNITED STATES PATENT OFFICE.

JOHN F. WEBENDORFER, OF BOONTON, NEW JERSEY, ASSIGNOR, BY MESNE ASSIGNMENTS, TO HEXAGON TOOL CO., OF NIAGARA FALLS, NEW YORK, A CORPORATION OF NEW YORK.

LATHE.

1,000,764.        Specification of Letters Patent.      Patented Aug. 15, 1911.

Application filed March 19, 1906. Serial No. 306,773.

*To all whom it may concern:*

Be it known that I, JOHN F. WEBENDORFER, residing at Boonton, in the county of Morris and State of New Jersey, have invented certain new and useful Improvements in Lathes, of which the following is a full, clear, and exact description, such as will enable others skilled in the art to which it appertains to make and use the same.

This invention relates to machines of the general type of lathes, though certain features thereof do not appear to be susceptible of any specific classification.

One of the objects thereof is to provide an efficient machine adapted upon work being supplied thereto to perform an operation or series of operations thereon with a maximum reliability and accuracy of action, and the highest rate of output.

Another object is to provide a machine of the above type adapted to operate simultaneously upon several pieces of work.

Another object is to provide a machine of the above type of simple and compact construction which shall be at all times under ready control, and all parts of which shall be readily accessible.

Other objects will be in part obvious and in part pointed out hereinafter.

The invention accordingly consists in the features of construction, combinations of elements and arrangement of parts which will be exemplified in the mechanism hereinafter described, and the scope of the application of which will be indicated in the following claims.

Figure 1:
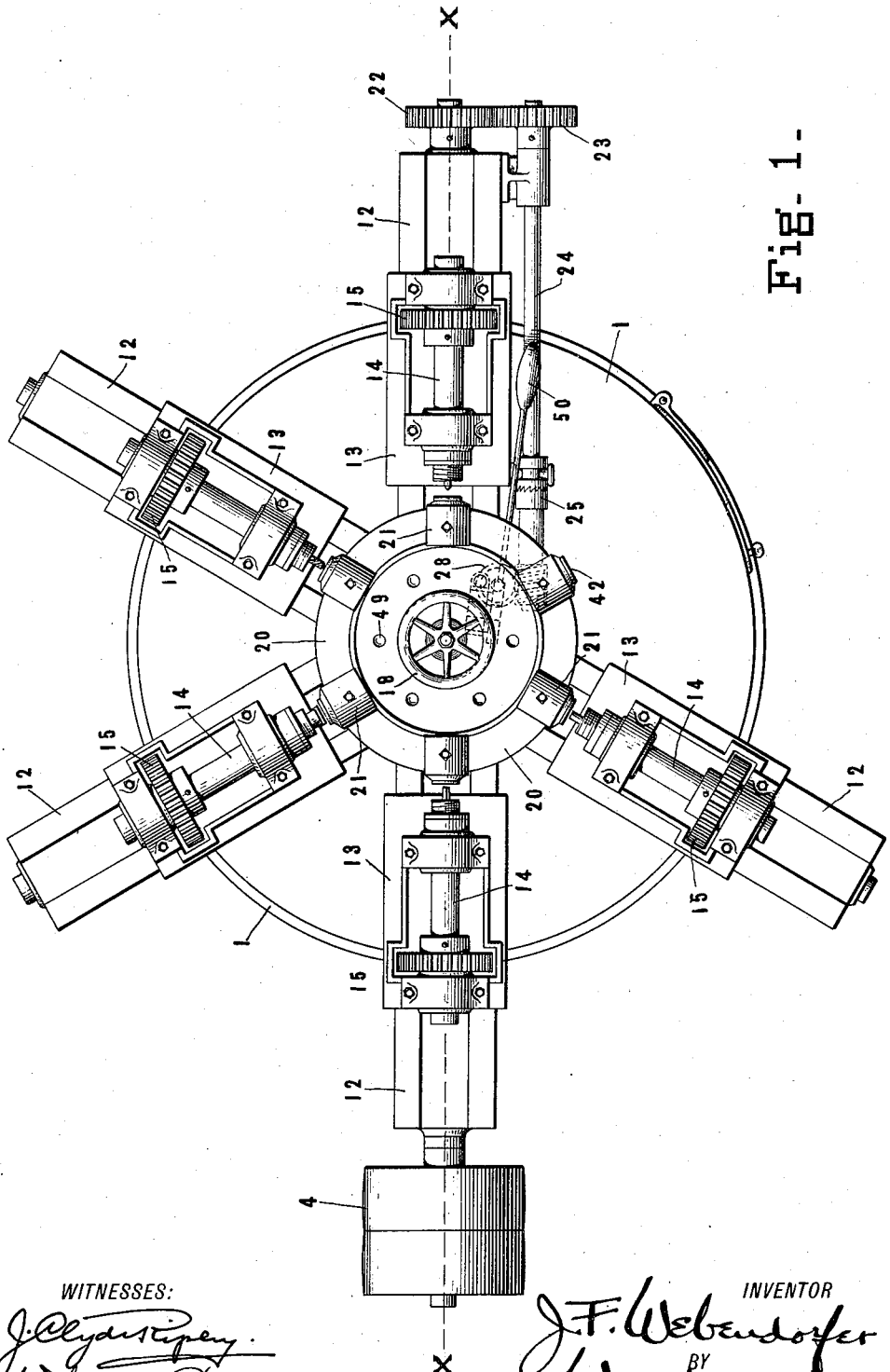
Figure 2:
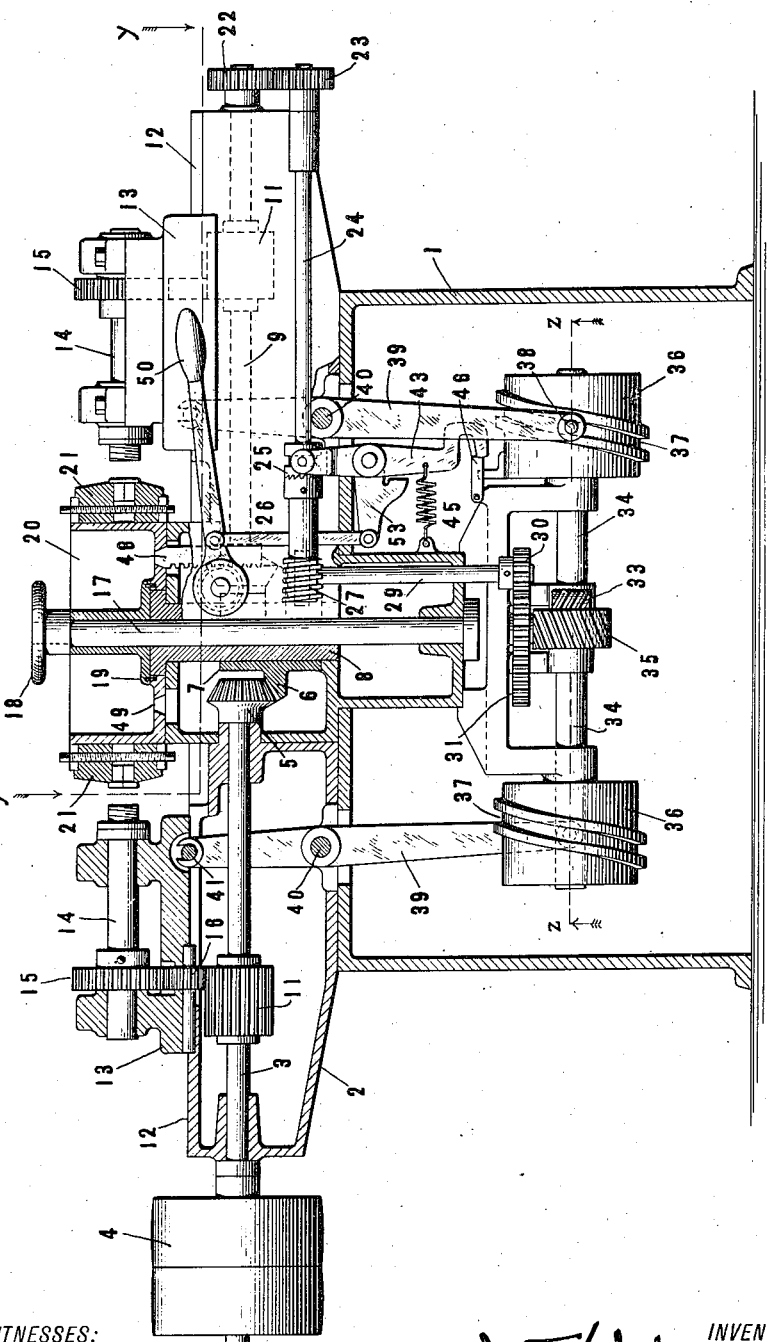
Figure 3:
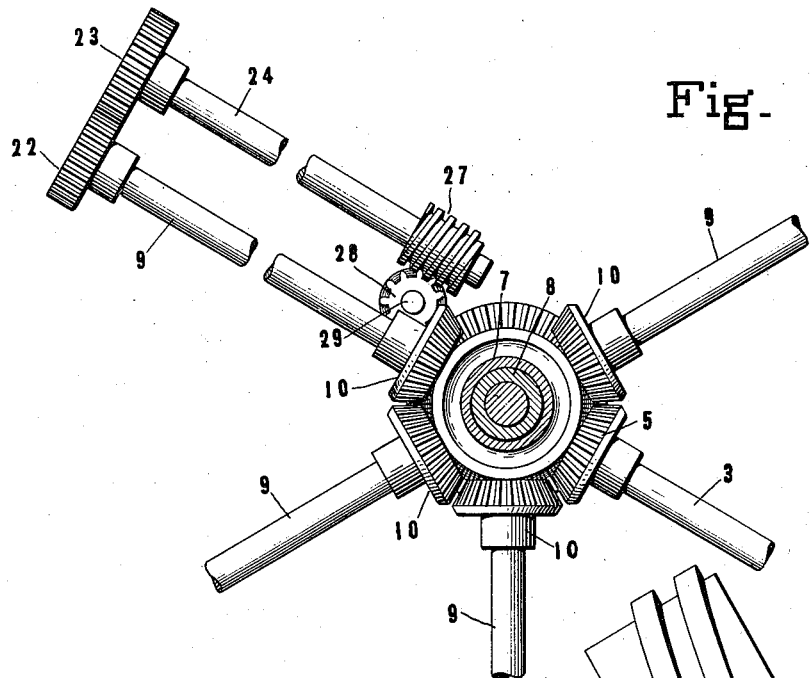
Figure 4:
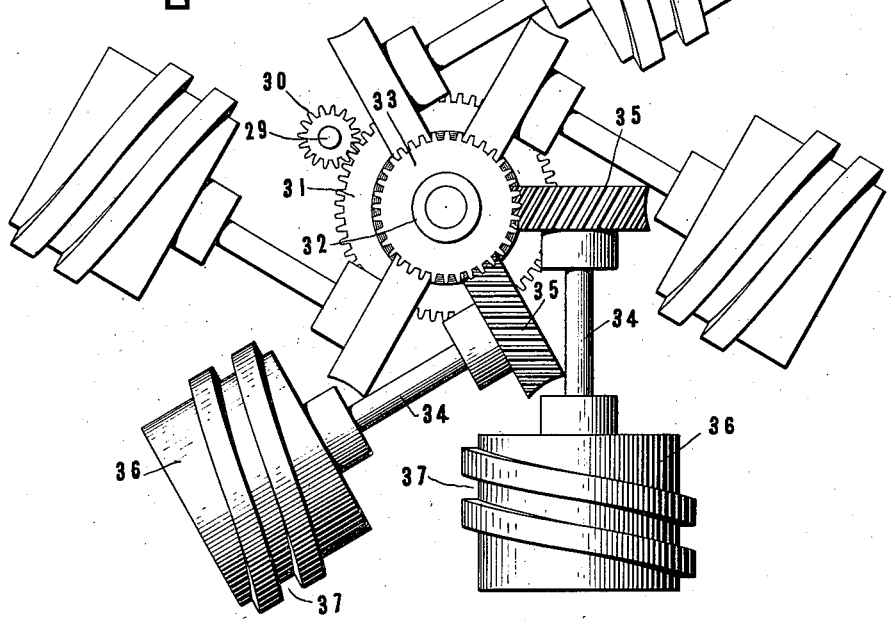

In the accompanying drawings, wherein is shown one of various possible embodiments of my invention, Figure 1 is a plan thereof. Fig. 2 is a sectional elevation taken substantially on the line *x—x* of Fig. 1, certain parts being omitted in order to render the disclosure more clear. Fig. 3 is a detail plan showing certain parts disclosed in a sectional view along line *y—y* of Fig. 2. Fig. 4 is a similar view along line *z—z* of Fig. 2. Fig. 5 is a detail elevation showing certain parts of an automatic stop mechanism. Fig. 6 is a similar view showing the same parts in another position.

Similar reference characters refer to similar parts throughout the several views of the drawings.

Preliminary to a detailed description of the embodiment of the invention herein set forth, and in order that the principles thereof may be most readily grasped, it may here be noted that the dominant problem dealt with is the increase in rate of output without a sacrifice of efficiency of action.

In machines of the general nature of those with which this invention deals the selling price of the individual product is often insignificant and the labor employed expensive. It is thus often a pre-requisite of a commercially successful process of manufacture that the machine be capable of attaining the highest speeds of working and rate of output, and be so compactly disposed, and of such reliable and automatic action, as to reduce to a minimum the amount and quality of manual labor required. It is also to be noted that unless the action of all parts is positive and certain, any gain in the nominal output is more than offset by annoying delays. The above and other defects are remedied in constructions of the nature of that hereinafter described.

Referring now to Fig. 2 of the accompanying drawings, there is shown a bed or support 1 upon which is mounted a frame 2 having journaled therein a driving shaft 3. This shaft is adapted to receive power from any desired source, as through the tight and loose pulleys 4, and to transmit the same by a bevel pinion 5 to a co-acting gear 6 upon a sleeve 7, loosely fitting about an inner sleeve 8. Radiating from gear 6, as best shown in Fig. 3 of the drawings, are a plurality of shafts 9 having thereon the pinions 10 intermeshing with this gear and journaled within suitable bearings in the frame 2. All of these shafts, as well as shaft 3, have fixed thereon spur gears 11 provided with broad faces, for a purpose hereinafter described.

Mounted upon ways 12, sets of which correspond with each of shafts 9, and the shaft 3 are what may be termed carriages 13. It may here be noted that the term "carriage" is used throughout this description and in the following claims as denoting any movable part or set of parts adapted to carry a tool or other device and move the same with respect to a fixed support.

As the several carriages 13, together with the parts mounted thereon, are substantially identical, one only will be described in detail. Journaled upon each carriage is a short shaft 14 provided with a spur gear 15 connected through the intermeshing idle pinion 16 with the corresponding gear 11 and adapted to preserve connection therewith irrespective of the position of the carriage upon its ways in any ordinary use of the machine. Shaft 14 is provided upon its inner end with any desired form of tool-holding means, the latter term being used throughout in its broadest sense. It will thus be seen that upon shaft 3 being driven, as through the pulleys shown, the several shafts 9 will receive power through the bevel gear 6 and each shaft transmit the same through the gears 11 and 15 to the shaft 14 mounted upon the corresponding carriage.

Loosely fitting within the sleeve 8 is a shaft 17 preferably having fixed thereon at its upper end a hand wheel 18, secured as shown at 19 to a rotary turret 20. Upon the outer lateral walls of this turret are provided chucks or other work-holding means 21, each of which is adapted to receive and hold a piece of work of any desired form. It may here be noted that the expression "work-holding means" or equivalent term is used throughout this description and in the following claims in its broadest sense to denote any means adapted to hold in position the material upon which it is desired that the tool or tools operate. These chucks preferably correspond in angular spacing with the carriages 13, and the entire turret may be rotated as by hand-wheel 18, so as to bring the chucks or work-holding means into operative relation, which in this illustrative embodiment is substantially in alinement with, the corresponding tool-holding means. It will be noted that the chucks preferably exceed in number the tool-holding means, for a purpose hereinafter set forth.

Upon the outer end of one of the shafts 9 is a spur gear 22 intermeshing with and adapted to drive a corresponding gear 23 upon a counter-shaft 24 journaled upon the frame of the machine. Shaft 24 is connected through a clutch 25 with a shaft or sleeve 26 having thereon a worm 27 in operative relation with a worm-wheel 28 upon a short vertical shaft 29. The latter part is provided with a pinion 30 driving through gear 31 a shaft or sleeve 32 provided with a spiral gear 33, as best shown in Fig. 4 of the drawings.

A number of shafts 34 are so disposed as to permit spiral gears 35 fixed thereon to intermesh with gear 33, and each of these is provided upon its outer surface with a cylindrical cam 36. As each of these cams, with the parts associated therewith, is substantially identical, one only will be described in detail. Resting within the cam groove 37 is a pin or roller 38 upon a lever 39 pivoted or fulcrumed to the frame of the machine as at 40, and suitably connected with one of the carriages 13, as shown at 41. It will thus be seen that upon shaft 24 being driven through the gears 22 and 23, a rotary movement will be imparted to the spiral gear 33 through the parts immediately above described, and transmitted to the several cams 36 which correspond in number with the carriages 13. This movement will result, through the action of the levers 39, in the reciprocation of the several carriages, and is so timed and speeded, as by suitable formation of the cam groove and relation of the several gears, as to drive the several tools at the desired rates in the direction of the corresponding pieces of work, and retract them at a higher rate of speed if a quick return be desired. The entire action, moreover, is so proportioned as to allow abundant time for the efficient operation of the slowest-acting tool. It will thus be seen that upon material being supplied by a workman standing opposite the idle chuck, as at 42, the several tools will be simultaneously advanced and retracted so as to perform their functions, and upon retraction the turret is rotated so as to throw the recently inserted piece of work in the idle chuck opposite the first tool, which is adapted to perform the first operation thereon; to shift each of the remaining chucks with respect to the tools so as to bring each in operative relation to the tool adapted to perform the next step thereon; and to bring the chuck containing the finished work into idle condition in a position directly opposite the workman.

In order to permit abundant time for the removal of the finished product and the insertion of raw material in the idle chuck, means are preferably provided whereby the reciprocating action of the carriages is stopped between each completed operation. These means comprise, in the present instance, a lever 43 fulcrumed as at 44 and connected with the clutch 25. This lever is normally pressed by a spring 45 in a direction to tend to throw out the clutch, but is held in clutch-closing condition by a pivoted dog 46. The latter part is automatically thrown up by a suitable trip 47 upon the corresponding cam at each complete rotation of this part, thus permitting the lever 43 to be retracted by its spring and the clutch to be thrown out, as shown in Fig. 6 of the drawings. The reciprocating movement of the carriage is thus stopped, without interruption, however, to the driving of the several tool-holding means inasmuch as the condition of clutch 25 does not affect these parts. Upon this operation being completed a locking pin 48, adapted to coact with suitable recesses or openings 49 in the turret and hold the same in exactly the desired relation to the several tool-holding means, is withdrawn as by means of a lever 50 provided with a pinion 51 intermeshing with a rack framed upon the pin. Lever 50 is connected, as by link 52, with a short lever 53 pivoted upon the fulcrum 44 and provided with an abutment 54 which engages the lever 43 with the clutch in open position, as shown in Fig. 6, but is suitably spaced from this part upon the clutch being closed. As the lever 50 is thus depressed to retract the locking pin 48 prior to rotating the turret, the lever 53 is swung downwardly, thus oscillating the lever 43 into clutch-closing position, in which condition it is held by the dog 46. The latter part is permitted to fall into its operative position, due to the passage thereof by the trip 47, by the momentum of the parts or other means, if desired.

The operation of the above-described embodiment of my invention, which has been to a large extent already set forth, is broadly as follows: Assuming shaft 3 to be driven as above described and power transmitted to the several shafts 9 and cams 36 through the connections set forth, a continuous rotary movement will be imparted to the several tool-holders and the carriage upon which they are mounted will be automatically reciprocated at the desired rate of speed and thrown out at the end of each operation by the stop mechanism immediately above described. Assuming the several chucks to be supplied each with a piece of work and the clutch to be thrown in as by the actuation of the locking means, each carriage will be advanced in such manner as to permit the corresponding tool to act upon the piece of work with which it is alined. These tools, in the preferred embodiment of my invention, are adapted to perform successive steps upon the same piece of work, as, for example, centering, drilling, facing, reaming, and the like. Thus, during each operation, time is provided for the removal from the idle chuck or chucks of the finished work and the insertion of the unfinished blanks, whereupon, the operation of the tools being completed, the turret is rotated through the angular space between successive tools and is locked into its shifted position.

It will thus be seen that I have provided means which are well adapted to accomplish the several objects of my invention and are of the most simple and positive action. All complicated mechanism is done away with, thus resulting in a low first cost of the machine and rendering it more reliable in use. The power required, moreover, is reduced to a minimum, and the weight of the parts is insignificant, inasmuch as no considerable stresses are brought to bear upon any portion thereof. It should be especially noted that, on account of the symmetrical disposition of the several tools, the thrusts exerted by the majority of the same are balanced by substantially equal and opposite thrusts caused by the opposing tool, thus materially relieving the work-holding means. It will also be seen that all parts are readily accessible and under convenient control of a single workman, thus reducing the cost of operation and rendering the machine eminently fitted for efficient and economical practical use.

As many changes could be made in the above construction and many apparently widely different embodiments of my invention could be made without departing from the scope thereof, I intend that all matter contained in the above description or shown in the accompanying drawing shall be interpreted as illustrative and not in a limiting sense. I desire it also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:—

1. In a machine of the class described, in combination, a driving shaft, a plurality of tool holding means mounted upon carriages, a plurality of cams, power transmitting means connecting said tool holding means with said driving shaft, power transmitting means connecting said cams with said driving shaft, the action of said first and said second power transmitting means being independent one of the other, and means connected with said cams adapted to positively reciprocate said carriages, each of said first power transmitting means comprising a pair of intermeshing gears, one of which is adapted to slide in meshing relation to the other thereof.

2. In a machine of the class described, in combination, a plurality of tool-holding means, carriages upon which said tool-holding means are mounted, means adapted to actuate said tool-holding means, means adapted to reciprocate said carriages, means adapted automatically to interrupt the action of said reciprocating means between predetermined periods of operation thereof, manually controlled means adapted to restart said reciprocating means, work holding means adapted to coact with said tool holding means, and means adapted to move said work holding means laterally with respect to said tool holding means.

3. In a machine of the class described, in combination, tool-holding means, a carriage upon which said tool-holding means are mounted, means adapted to actuate said tool-holding means, means adapted to reciprocate said carriage, means adapted automatically to interrupt the action of said third means between predetermined periods of operation thereof, work-holding means movable relative to said carriage, means adapted to lock said work-holding means in operative relation to said tool-holding means, and manually controlled means connected with said locking means adapted to re-start said third means.

4. In a machine of the class described, in combination, tool-holding means, a carriage upon which said tool-holding means are mounted, means adapted to actuate said tool-holding means, means adapted to reciprocate said carriage, means independent of the action of said second means adapted automatically to interrupt the action of said third means between predetermined periods of operation thereof, work-holding means movable relative to said carriage, means adapted to lock said work-holding means in operative relation to said tool-holding means, and manually controlled means connected with said locking means adapted to re-start said third means.

5. In a machine of the class described, in combination, tool-holding means, a carriage upon which said tool-holding means are mounted, means adapted to actuate said tool-holding means, means adapted to reciprocate said carriage, a clutch controlling the action of said third means, means comprising a spring adapted to open said clutch, an automatic trip controlled in accordance with said third means adapted to release said spring and open said clutch, and manually controlled means adapted to throw in said clutch and re-start said third means.

6. In a machine of the class described, in combination, tool-holding means, a carriage upon which said tool-holding means are mounted, means adapted to actuate said tool-holding means, means adapted to reciprocate said carriage, a clutch controlling the action of said third means, means comprising a spring adapted to open said clutch, an automatic trip controlled in accordance with said third means adapted to release said spring and open said clutch, work-holding means movable relative to said carriage, means adapted to lock said work-holding means in operative relation to said tool-holding means, and manually controlled means connected with said locking means adapted to throw in said clutch and re-start said third means.

7. In a machine of the class described, in combination, a plurality of tool-holding means, means adapted to hold a plurality of pieces of work, means adapted to permit a relative movement of said first two means and bring the pieces of work successively into operative relation to each tool, carriages upon which said tool-holding means are mounted, means adapted to drive said tool-holding means, means adapted to reciprocate said carriages and maintain said drive, means adapted automatically to interrupt the action of said reciprocating means between predetermined periods of operation, and manually-controlled means adapted to re-start the same.

8. In a machine of the class described, in combination, tool-holding means, means adapted to hold a plurality of pieces of work, means adapted to permit a relative movement of said first two means and bring the pieces of work successively into operative relation to the tool, a carriage upon which said tool-holding means is mounted, means adapted to actuate said tool-holding means, means adapted to reciprocate said carriage, means adapted automatically to interrupt the action of said reciprocating means between predetermined periods of operation, means adapted to lock said work-holding means with the work in operative relation to the tool, and means connected with said locking means adapted to re-start the said reciprocating means.

9. In a machine of the class described, in combination, a plurality of tool-holding means, means adapted to hold pieces of work in operative relation to all of said tool-holding means, means adapted simultaneously to permit shifting of all of said pieces of work relative to the corresponding tool-holding means and into operative relation with others thereof, carriages upon which said tool-holding means are rotatably mounted, driving means, means associated with said driving means adapted to rotate said tool-holding means, and means associated with said driving means adapted automatically to reciprocate said carriages with respect to each piece of work and maintain the rotation of their associated tool-holding means.

10. In a machine of the class described, in combination, a turret having mounted thereon a plurality of work-holding means, a plurality of tool-holding means disposed in operative relation to a plurality of said work-holding means, said work-holding means exceeding in number said tool-holding means, means adapted to permit a relative rotary movement of said turret and said several tool-holding means, means adapted to cause a relative reciprocating movement of said several tool-holding means and the work-holding means adjacent which they are positioned, means adapted automatically to interrupt the action of said reciprocating means between successive operations thereof, means adapted to lock said turret in predetermined position, and means connected with said locking means adapted to re-start said reciprocating means.

11. In a machine of the class described, in combination, a plurality of work-holding means, a plurality of tool-holding means radially arranged about and in operative relation to said work-holding means, a driving member, a centrally arranged driven member, a plurality of radially arranged shafts operatively associated with said driven member to rotate said tool holding means, a plurality of rotative members, means operatively associated with said driven member adapted to drive all of said rotative members, and a plurality of means connecting respectively one of said rotative members with one of said tool-holding means and adapted to reciprocate said tool-holding means.

12. In a machine of the class described, in combination, a plurality of work-holding means, a plurality of tool-holding means radially arranged about and in operative relation to said work-holding means, a driving member, a centrally arranged driven member, a plurality of radially arranged shafts operatively associated with said driven member to rotate said tool-holding means, a plurality of rotative members, means operatively associated with said driven member adapted to drive all of said rotative members, a plurality of means connecting respectively one of said rotative members with one of said tool-holding means and adapted to reciprocate said tool-holding means, and means adapted automatically to interrupt the action of said rotative members between successive operations of said tool-holding means.

In testimony whereof I affix my signature, in the presence of two witnesses.

JOHN F. WEBENDORFER.

Witnesses:
H. M. SEAMANS,
R. F. MARTIN.